(12) United States Patent
Feng et al.

(10) Patent No.: US 12,536,169 B2
(45) Date of Patent: Jan. 27, 2026

(54) DATA ACCESS METHOD FOR DATABASE, APPARATUS, AND DEVICE

(71) Applicant: Huawei Technologies Co., Ltd., Shenzhen (CN)

(72) Inventors: Ben Feng, Hangzhou (CN); Mingjian Que, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/743,886

(22) Filed: Jun. 14, 2024

(65) Prior Publication Data

US 2024/0330285 A1  Oct. 3, 2024

Related U.S. Application Data

(63) Continuation of application No. PCT/CN2022/138264, filed on Dec. 11, 2022.

(30) Foreign Application Priority Data

Dec. 15, 2021  (CN) .......................... 202111539845.4

(51) Int. Cl.
  *G06F 16/24*   (2019.01)
  *G06F 16/2452*  (2019.01)
  *G06F 16/2453*  (2019.01)

(52) U.S. Cl.
  CPC .. *G06F 16/24524* (2019.01); *G06F 16/24537* (2019.01); *G06F 16/24542* (2019.01)

(58) Field of Classification Search
  CPC ................................................ G06F 16/24524
  See application file for complete search history.

(56) References Cited

U.S. PATENT DOCUMENTS

| | | | | |
|---|---|---|---|---|
| 8,903,762 | B2* | 12/2014 | Jin | G06F 8/20 707/602 |
| 9,589,030 | B1* | 3/2017 | El-Helw | G06F 16/2471 |
| 12,013,856 | B2* | 6/2024 | Avalani | G06F 16/25 |
| 2012/0089595 | A1* | 4/2012 | Jaecksch | G06F 16/24542 707/718 |
| 2018/0210916 | A1* | 7/2018 | Zhang | G06F 16/24542 |
| 2019/0146970 | A1* | 5/2019 | Chamieh | G06F 16/24524 707/718 |
| 2020/0089679 | A1* | 3/2020 | Okcan | G06F 16/2453 |
| 2020/0401592 | A1* | 12/2020 | Schreier | G06F 16/2455 |
| 2021/0073226 | A1* | 3/2021 | Chavan | G06F 16/24569 |
| 2021/0255896 | A1* | 8/2021 | Dong | G06F 9/5066 |
| 2021/0286817 | A1* | 9/2021 | Cruanes | G06F 16/24537 |
| 2021/0311944 | A1* | 10/2021 | Park | G06F 16/24542 |
| 2022/0004551 | A1* | 1/2022 | Ghazal | G06F 16/2455 |
| 2022/0243575 | A1* | 8/2022 | Kristensen | G06F 30/28 |

FOREIGN PATENT DOCUMENTS

| | | |
|---|---|---|
| CN | 111061757 A | 4/2020 |
| WO | 2021031407 A1 | 2/2021 |

* cited by examiner

*Primary Examiner* — Mohammad S Rostami
(74) *Attorney, Agent, or Firm* — Conley Rose, P.C.

(57) ABSTRACT

A data access method for a database comprising obtaining a first execution plan that is based on a data access instruction initiated in any database; generating a second execution plan based on the first execution plan; and accessing data in the database based on the second execution plan.

20 Claims, 7 Drawing Sheets

DATA ACCESS METHOD FOR DATABASE, APPARATUS, AND DEVICE

CROSS-REFERENCE TO RELATED APPLICATIONS

This application is a continuation of International Patent Application No. PCT/CN2022/138264, filed on Dec. 11, 2022, which claims priority to Chinese Patent Application No. 202111539845.4 filed on Dec. 15, 2021. The disclosures of the aforementioned applications are hereby incorporated by reference in their entireties.

TECHNICAL FIELD

This application relates to the field of communication technologies, and in particular, to a data access method for a database, an apparatus, and a device.

BACKGROUND

Currently, open-source databases such as POSTGRESQL, MYSQL, and ORACLE Database are widely used. The open-source database can store data and manage data. A common open-source database is mainly used in an online transaction processing (OLTP) scenario, to perform operations such as addition, deletion, viewing, and modification on data conveniently. However, in an online analytical processing (OLAP) scenario, the open-source database has poor performance, and cannot meet a complex data analysis requirement.

To improve a data analysis capability of the open-source database, a developer is dedicated to in-depth customization of different open-source databases, to develop an execution engine for the open-source database.

However, such an in-depth customization manner is performed for a single open-source database, and cannot be compatible with different open-source databases.

SUMMARY

This application provides a data access method for a database, an apparatus, and a device, to resolve a problem in other approaches.

According to a first aspect, an embodiment of this application provides a data access method for a database. The method may be performed by an instruction execution apparatus. The method may be used in a scenario in which a client initiates data access instructions for different databases. In the method, the instruction execution apparatus may first obtain a first execution plan. The first execution plan may be from any database, and the first execution plan is generated based on a data access instruction initiated in the any database. The instruction execution apparatus may generate a second execution plan based on the first execution plan, and then access data in the database based on the second execution plan.

According to the method, the instruction execution apparatus can process first execution plans from the different databases, and is adapted to the different databases, so that a matching degree is high. In addition, the instruction execution apparatus performs a data access operation, so that data access efficiency can be effectively improved.

In a possible implementation, when generating the second execution plan, the instruction execution apparatus may process the first execution plan. The processing includes some or all of the following such as splitting an operator in the first execution plan, combining operators in the first execution plan, mapping the operator in the first execution plan, adjusting an execution sequence of the operators in the first execution plan, configuring a data input format for the operator in the first execution computing, and selecting execution hardware for the operator in the first execution computing.

According to the method, the instruction execution apparatus may perform a plurality of different processing operations on the first execution plan, so that the first execution plan can be converted into the second execution plan more efficiently and flexibly.

In a possible implementation, when accessing the data in the database based on the second execution plan, the instruction execution apparatus may read a data table from the database, and then execute operators in the second execution plan in an execution sequence of the operators in the second execution plan, to access the data table.

According to the method, the instruction execution apparatus can actively read the data table from the database, and access the data in the data table based on the second execution plan. The instruction execution apparatus can independently complete an entire data access operation, to ensure data access efficiency.

In a possible implementation, when the instruction execution apparatus executes the operators in the second execution plan in the execution sequence of the operators in the second execution plan, the instruction execution apparatus may convert a format of the data table based on a data input format of the operators in the second execution plan; and the instruction execution apparatus may further configure execution hardware based on the execution hardware selected for the operator in the second execution plan, to enable the execution hardware to execute the operator, and trigger the execution hardware to execute the operator.

According to the method, the instruction execution apparatus adjusts a format of the data table, and configures the execution hardware for the operator, to ensure that the second execution plan can be efficiently executed.

In a possible implementation, when the instruction execution apparatus triggers the execution hardware to execute the operator, the instruction execution apparatus creates a plurality of computing threads by using the execution hardware; and enables the plurality of computing threads to run in parallel to execute the operator.

According to the method, operator execution efficiency can be ensured by using the plurality of computing threads.

In a possible implementation, the data input format is a row-store data format or a column-store data format.

According to the method, the instruction execution apparatus may configure a corresponding data input format based on a computing feature of the operator, to further ensure operator execution efficiency.

In a possible implementation, the execution hardware includes some or all of the following such as a central processing unit (CPU), a graphics processing unit (GPU), a deep-learning processing unit (DPU), a neural-network processing unit (NPU), and a tensor processing unit (TPU).

According to the method, the instruction execution apparatus may configure the execution hardware for the operator based on the computing feature of the operator, so that the execution hardware can efficiently execute the operator.

According to a second aspect, an embodiment of this application further provides an instruction execution apparatus. The instruction execution apparatus has a function of implementing a behavior in the method instance in the first aspect. For beneficial effects, refer to the descriptions in the first aspect. Details are not described herein again. The function may be implemented by hardware, or may be implemented by hardware executing corresponding software. The hardware or the software includes one or more modules corresponding to the function. In a possible design, a structure of the instruction execution apparatus includes an obtaining module, a generation module, and an access module. These modules may perform corresponding functions in the method example in the first aspect. For details, refer to detailed descriptions in the method example. Details are not described herein again.

According to a third aspect, an embodiment of this application further provides a computing device. The computing device has a function of implementing a behavior in the method instance in the first aspect. For beneficial effects, refer to the descriptions in the first aspect. Details are not described herein again. A structure of the computing device includes a processor and a memory. The processor is configured to support the computing device to perform a corresponding function in the method in the first aspect. The memory is coupled to the processor, and stores program instructions and data that are necessary for the computing device. The structure of the computing device further includes a communication interface, configured to communicate with another device, for example, may obtain a first execution plan and a data table in a database.

According to a fourth aspect, this application further provides a computer-readable storage medium. The computer-readable storage medium stores instructions, and when the instructions are run on a computer, the computer is enabled to perform the method according to any one of the first aspect and the possible implementations of the first aspect.

According to a fifth aspect, this application further provides a computer program product including instructions. When the computer program product is run on a computer, the computer is enabled to perform the method according to any one of the first aspect and the possible implementations of the first aspect.

According to a ninth aspect, this application further provides a computer chip. The chip is connected to a memory, and the chip is configured to read and execute a software program stored in the memory, to perform the method according to any one of the first aspect and the possible implementations of the first aspect.

DESCRIPTION OF EMBODIMENTS

Figure 1:
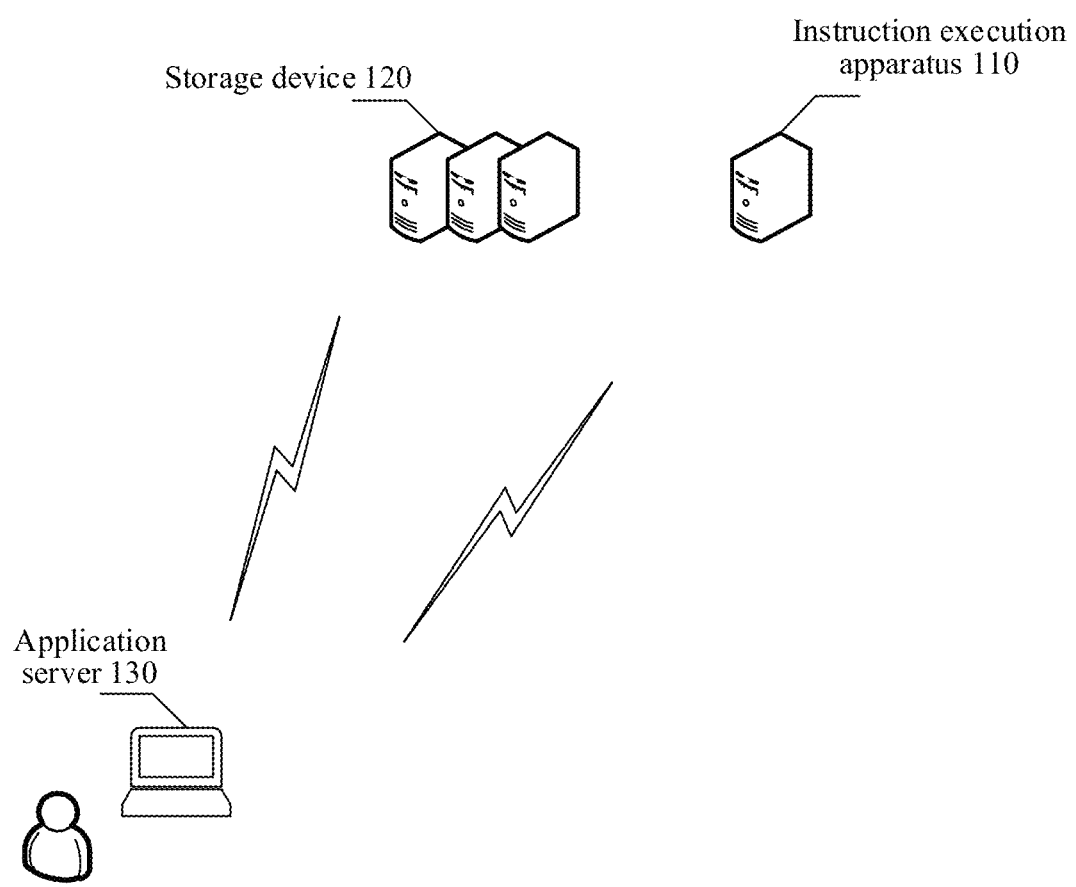
FIG. 1 is a schematic diagram of an architecture of a system according to this application.

FIG. 1 is a schematic diagram of a structure of a system according to an embodiment of this application. The system includes an instruction execution apparatus 110 and at least one storage device 120. The instruction execution apparatus 110 is connected to the storage device 120. Optionally, the system further includes an application server 130.

The application server 130 is deployed on a user side. A user may trigger the application server 130 by operating database client software deployed on the application server 130, to generate a data access instruction, and send the generated data access instruction to the storage device 120.

The data access instruction is used to access data in a database. The application server 130 may be a physical machine, or may be a virtual machine. The application server 130 includes but is not limited to a desktop computer, a server, a notebook computer, and a mobile device. The application server 130 is connected to the storage device 120 through a network, to obtain the data in the database from the storage device 120.

In this embodiment of this application, the storage device 120 may be a node in a storage system. The storage system may be a centralized storage system, or may be a distributed storage system. Database server software runs on the at least one storage device 120, and the at least one storage device 120 is configured to store the data in the database. The storage device 120 may receive the data access instruction from the application server 130, and process the data access instruction. In this embodiment of this application, the storage device 120 may parse the data access instruction, and generate a first execution plan based on the data access instruction.

The instruction execution apparatus 110 is connected to the storage device 120. The instruction execution apparatus 110 may invoke the first execution plan, and access the data in the database based on the first execution plan.

For the instruction execution apparatus 110, the first execution plan obtained by the instruction execution apparatus 110 is generated based on a data access instruction initiated for any database. Data access instructions used to access data in different databases are processed by the storage device 120, so that different execution plans can be generated. The instruction execution apparatus 110 may process the different execution plans. It can be learned that the instruction execution apparatus 110 is applicable to different databases, and is universal. For a manner in which the instruction execution apparatus 110 accesses, based on the first execution plan, the data stored in the storage device 120, refer to the embodiment shown in FIG. 2.

A specific form of the instruction execution apparatus 110 is not limited in this embodiment of this application. The instruction execution apparatus 110 may be a hardware apparatus, for example, a server, a terminal computing device, or a hardware module deployed in the storage device 120. The instruction execution apparatus 110 may also be a software apparatus. For example, the instruction execution apparatus 110 may run an application on a server or a terminal computing device, or a function plug-in in database software running on the storage device 120.

In this embodiment of this application, the instruction execution apparatus 110 can process an execution plan from any database, and has strong compatibility. After receiving the execution plan from the any database, the instruction execution apparatus 110 accesses the data in the database by processing the execution plan from the any database. A data access operation is implemented by the instruction execution apparatus 110 instead of a storage apparatus, to accelerate a data access procedure, and improve data access efficiency.

Figure 2:
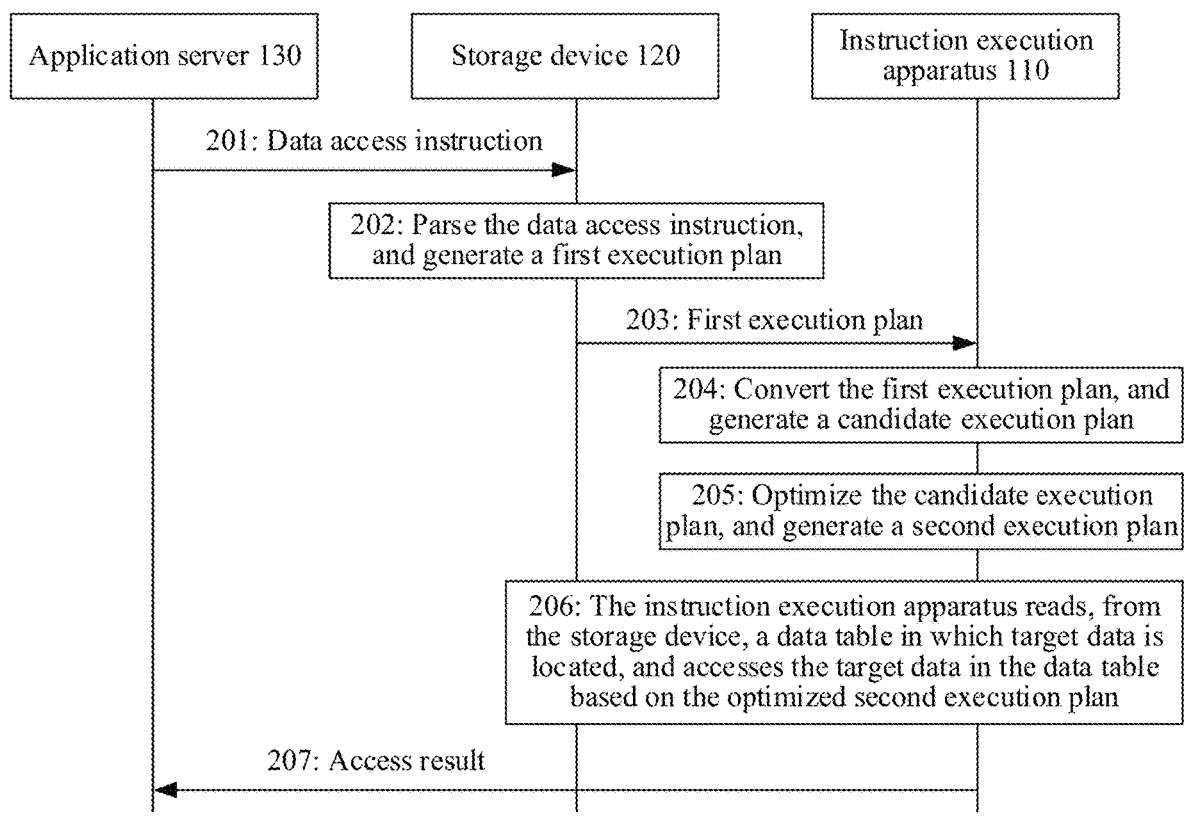
FIG. 2 is a schematic diagram of a data access method for a database according to this application.

With reference to FIG. 2, the following describes a data access method for a database according to an embodiment of this application. The method includes the following steps.

Step 201: An application server 130 sends a data access instruction to a storage device 120, where the data access instruction is used to access target data in a database.

A user may operate database client software running on the application server 130, for example, indicate to access some data in the database, or indicate to compute some data in the database, to trigger the application server 130 to initiate the data access instruction to the storage device 120. The data access instruction indicates target data that needs to be accessed and an access manner.

MYSQL is used as an example. The user may enter a search query language (SQL) statement in an interface of a MYSQL client. For example, the entered SQL statement may indicate to view one or more rows of data that meet a specific requirement in a data table. For another example, the entered SQL statement may indicate to obtain a sum, an average value, a minimum value, or a maximum value of data that meets a specific requirement in a column of data in a data table. In this way, the SQL statement essentially represents target data that needs to be accessed by the user and an access manner (for example, an operation such as extracting one or more rows of data, sorting, or obtaining a sum, an average value, a minimum value, or a maximum value). After detecting the entered SQL statement, the application server 130 generates a data access instruction. The data access instruction carries the SQL statement.

Step 202: After the storage device 120 receives the data access instruction, the storage device 120 parses the data access instruction, and generates a first execution plan.

The storage device 120 can determine, by parsing the data access instruction, target data that needs to be accessed by the application server 130 and an access manner.

When processing the data access instruction, the storage device 120 generates the first execution plan based on the target data that needs to be accessed and the access manner that are indicated in the data access instruction. The first execution plan describes an operator that needs to be used to access the target data and an operator execution sequence.

An operator represents a data processing manner. Operators supported by different databases are different. Operators that implement a same function have different execution manners. For example, both MYSQL and POSTGRESQL support a scan operator, and the scan operator indicates to extract some or all data in a data table. However, when the scan operator in MYSQL extracts data, the operator extracts data in a single-thread mode, that is, through only one thread. When the scan operator in POSTGRESQL extracts data, the operator extracts data in parallel in a multi-thread mode, that is, through a plurality of threads.

It should be noted herein that, when the first execution plan describes a used operator, the first execution plan may describe a name of the operator, data that needs to be processed by the operator, a constraint condition of processing data by the operator, and the like. MYSQL is used as an example. When the first execution plan includes a filter operator and the first execution plan describes the filter operator, it is marked that a name of the operator is a filter operator, it is marked that the operator needs to process a data table A, and it is further recorded that the operator needs to select data whose value is greater than 10 in Row B in the data table A. Selecting the data whose value is greater than 10 in Row B in the table may be understood as a constraint condition for processing data by the operator.

Because a database is deployed in the storage device 120, the first execution plan generated by the storage device 120 is an execution plan valid for the database deployed in the storage device 120.

Figure 3:
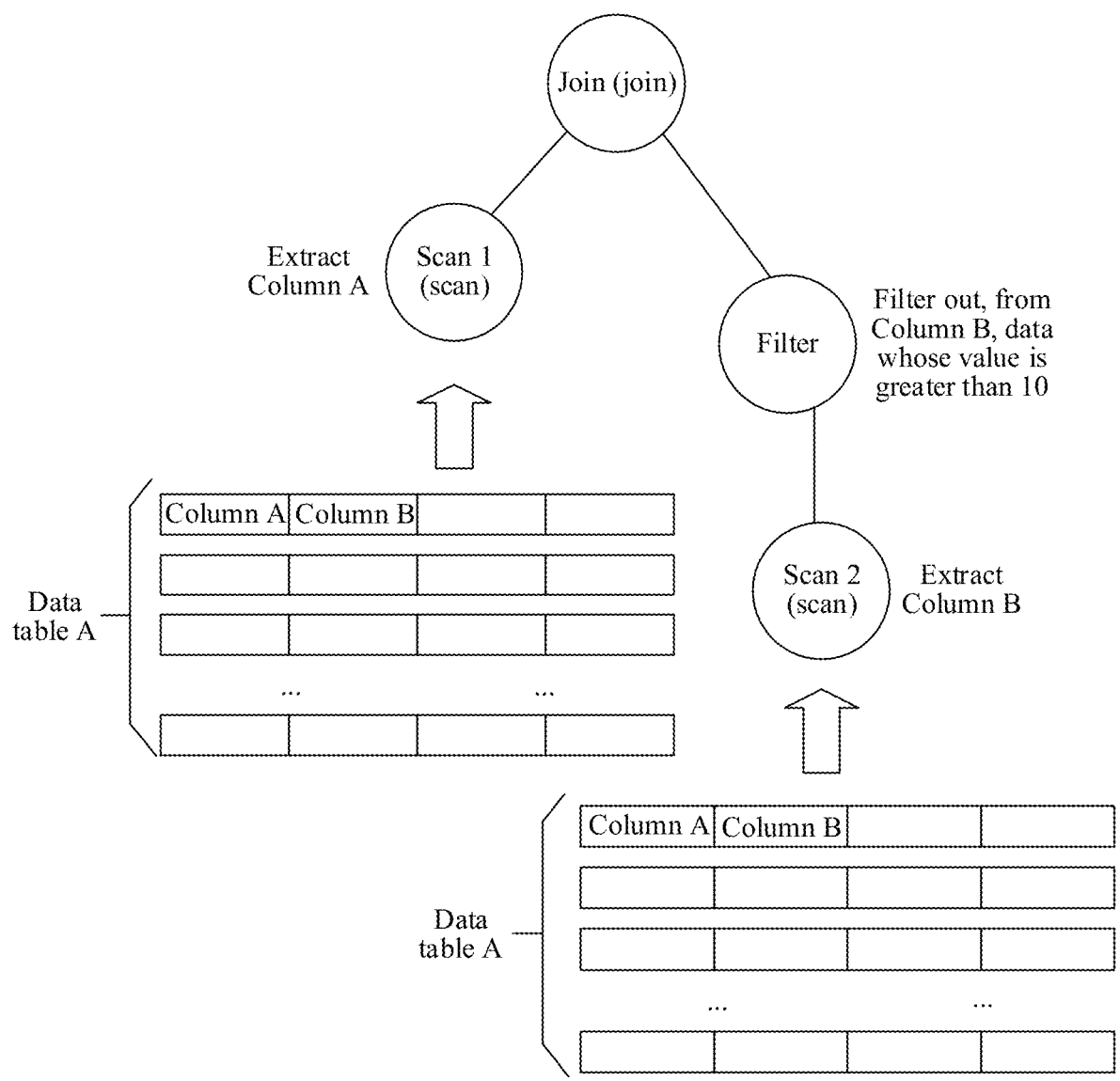
FIG. 3 is a schematic diagram of a first execution plan according to this application.

Herein, the data access instruction indicates that data in Column A and data whose value is greater than 10 in Column B in the data table A need to be combined. FIG. 3 is a schematic diagram of a first execution plan according to this application. For ease of understanding, the first execution plan is drawn in a tree structure.

The first execution plan has two branches. A branch 1 includes a scan operator 1, and the scan operator 1 is used to extract Column A from the data table A. A branch 2 includes a scan operator 2 and a filter operator. The scan operator 2 extracts Column B from data A, and the filter operator is used to filter out, from Column B, data whose value is greater than 10. A junction of the two branches is a join operator. The join operator is used to combine the data in Column A and the data whose value is greater than 10 in Column B.

Step 203: After generating the first execution plan, the storage device 120 may send the first execution plan to an instruction execution apparatus 110.

In this embodiment of this application, the storage device 120 may directly send the first execution plan to the instruction execution apparatus 110, or may first determine whether the first execution plan needs to be sent to the instruction execution apparatus 110. The storage device 120 may be configured with a sending condition. For example, the sending condition may be that a quantity of operators in the execution plan is greater than a threshold A, or a quantity of branches in the execution plan is greater than a threshold B. When determining that the first execution plan meets the sending condition, the storage device 120 may perform step 203.

In this embodiment of this application, after the storage device 120 generates the first execution plan, the storage device 120 may not access the target data based on the first execution plan, but delivers the first execution plan to the instruction execution apparatus 110. The instruction execution apparatus 110 processes the first execution plan, accesses the target data, and hands over a data access operation to the instruction execution apparatus 110, to accelerate access. For a manner in which the instruction execution apparatus 110 processes the first execution plan, refer to step 204 to step 207.

When processing the first execution plan, the instruction execution apparatus 110 may generate a second execution plan (step 204 and step 205), and then access the target data based on the second execution plan (step 206 and step 207).

Step 204: The instruction execution apparatus 110 converts the first execution plan, and generates a candidate execution plan.

The instruction execution apparatus 110 may maintain a standard operator library. The standard operator library includes a plurality of operators. For any database, conversion can be performed between an operator supported by the database and an operator in the standard operator library. For example, the operator supported by the database may be split into a plurality of operators in the standard operator library (for example, also referred to as splitting of the operator). For another example, a plurality of operators supported by the database may also be combined into one or more operators in the standard operator library (for example, also referred to as a combination of operators). For another example, an operator supported by the database may be converted into an operator that can implement a same computing operation in the standard operator library (for example, one-to-one mapping between operators).

MYSQL is used as an example. MYSQL has an independent filter operator and an independent scan operator. A scan operator in the standard operator library has a filtering function. Therefore, the scan operator and the filter operator in MYSQL may be combined into the scan operator in the standard operator library.

After obtaining the first execution plan, the instruction execution apparatus 110 may analyze an operator in the first execution plan, may map the operator in the first execution plan to an operator in the standard operator library, may combine a plurality of operators in the first execution plan into one or more operators in the standard operator library, or may split one operator in the first execution plan into a plurality of operators in the standard operator library, to generate a candidate execution plan.

The instruction execution apparatus 110 may further analyze an execution sequence of operators in the first execution plan in addition to converting the operator in the first execution plan, and may further adjust the execution sequence of the operators in the first execution plan when converting the first execution plan into the candidate execution plan.

For example, some execution sequences that do not conform to computing logic or waste computing resources may exist in the first execution plan generated by the storage device 120. When the data access instruction indicates to round data greater than 10 in Column A of the data table A, the first execution plan may record the following operators and an execution sequence of the operators: invoking the scan operator to extract data in Column A of the data table A; invoking a rounding operator to round the data in Column A, and invoking the filter operator to extract the data greater than 10 in Column A. In the first execution plan, rounding is performed, and then data is extracted. Consequently, data that is not greater than 10 is also rounded during rounding, and some unnecessary computing is performed. When converting the first execution plan, the instruction execution apparatus 110 may adjust a sequence of the rounding operator and the filter operator. After the scan operator extracts the data in Column A in data A, the filter operator extracts the data greater than 10 in Column A, and then invokes the rounding operator to round the data greater than 10 in Column A.

Figure 4:
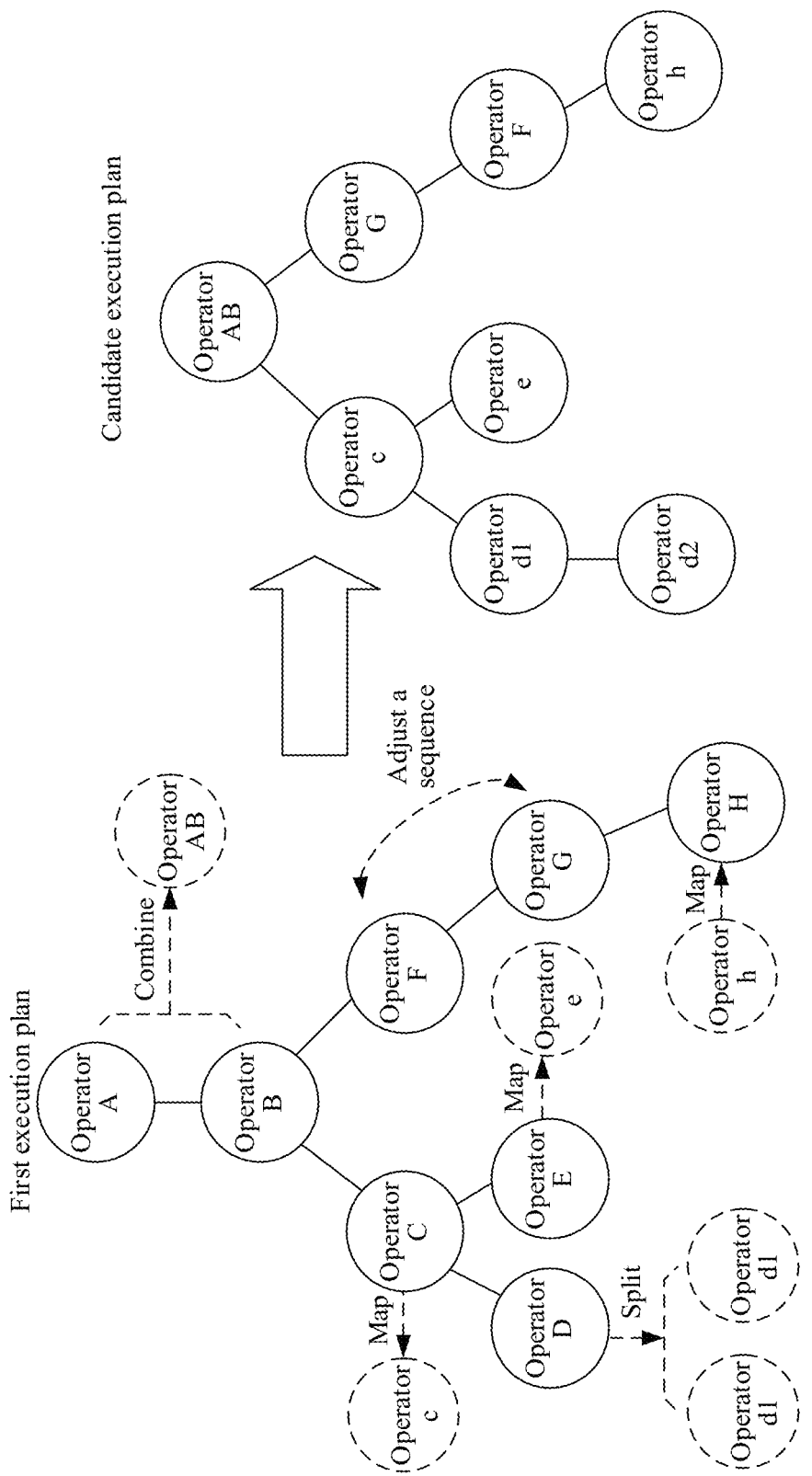
FIG. 4 is a schematic diagram of converting a first execution plan into a candidate execution plan according to this application.

FIG. 4 shows a manner in which the instruction execution apparatus 110 converts the first execution plan into the candidate execution plan. FIG. 4 shows four manners: one-to-one mapping (from an operator C to an operator c, from an operator E to an operator e, and from an operator H to an operator h), splitting of an operator (splitting an operator D into an operator d1 and an operator d2), a combination of operators (combining an operator A and an operator B into an operator AB), and adjustment of an execution sequence (changing a sequence of an operator F and G).

For the candidate execution plan generated in step 204, an operator included in the candidate execution plan is an operator in the standard operator library, that is, no longer includes the operator supported in the database. In such a conversion manner, execution plans valid for different databases can be converted, and an execution plan obtained through conversion is an execution plan formed based on the standard operator library. Such an execution plan conversion manner is applicable to different databases.

After generating the candidate execution plan, the instruction execution apparatus 110 may directly access the target data based on the candidate execution plan. The instruction execution apparatus 110 may further optimize the candidate execution plan, that is, perform step 205.

Step 205: The instruction execution apparatus 110 optimizes the candidate execution plan, and generates the second execution plan.

In this embodiment of this application, the instruction execution apparatus 110 optimizes the second execution plan in a plurality of manners. The following lists several of the manners.

Manner 1: Execution Hardware is Selected for an Operator in the Second Execution Plan.

There may be a plurality of types of execution hardware of an execution operator that can be invoked by the instruction execution apparatus 110. The execution hardware is usually some components that have a computing function, for example, a CPU, a GPU, a DPU, or an NPU.

For a same operator, efficiency of executing the operator by different hardware is different. For example, for some operators of complex computing such as a scan operator or a group by operator, execution efficiency of the GPU is clearly higher than execution efficiency of the CPU. The GPU is more applicable to such an operator of complex computing, and the CPU is more applicable to some operators of a simple operation such as a join operator. The instruction execution apparatus 110 may select corresponding execution hardware for different operators in the second execution plan, to ensure that the second execution plan can run efficiently when the target data is subsequently accessed based on the second execution plan.

Manner 2: A Data Input Format is Configured for an Operator in the Second Execution Plan.

Based on data that needs to be processed by the operator in the second execution plan and a constraint condition of processing the data by the operator, different operators require different data input formats.

For example, when the scan operator needs to extract data in a table at a behavior granularity, for example, the scan operator needs to extract data from a first row to a tenth row in the data table A, the data table A that may be input into the scan operator is a row-store data table A. When the scan operator needs to extract data in a table at a column granularity, for example, the scan operator needs to extract data from a second column to a fifth column in the data table A, the data table A that may be input into the scan operator is a column-store data table A.

The row-store data table means that when the data table is stored, data is arranged and organized for storage by row. The column-store data table means that when the data table is stored, data is arranged and organized for storage by column.

Therefore, the instruction execution apparatus 110 may select the data input format of the operator for the operator in the second execution plan with reference to a computing feature of the operator in the second execution plan (for example, the data that needs to be processed by the operator and the constraint condition of processing the data by the operator), that is, configure the data input format of the operator to be row-store data or column-store data.

It should be noted that, usually, any execution plan (for example, the first execution plan or the second execution plan) may be abstracted as a tree structure. Each branch in the tree structure includes at least one operator, and the operator in each branch is executed in a serial manner, that is, an output of a previous operator is an input of a current operator. An execution sequence of operators in the branch is a bottom-to-top execution sequence. When configuring the data input format for the operator in the second execution plan, the instruction execution apparatus 110 may configure only a data input format of an operator that is to be first executed in each branch (that is, an operator at a bottommost location in the branch).

The indication processing apparatus may optimize the second execution plan in one or both of the two manners. In addition, a manner in which the instruction execution apparatus 110 optimizes the second execution plan is merely an example, and a manner of optimizing the second execution plan is not limited in this application.

After generating the second execution plan, the instruction execution apparatus 110 may execute the second execution plan. For details, refer to step 206 and step 207.

Step 206: The instruction execution apparatus 110 reads, from the storage device 120, a data table in which the target data is located, and accesses the target data in the data table based on the optimized second execution plan.

The instruction execution apparatus 110 is connected to the storage device 120, and may read a data table in the database from the storage device 120. After obtaining the data table in which the target data is located, the instruction execution apparatus 110 may convert the data table based on the data input format of the operator in the second execution plan, for example, convert the data table into a row-store data table or a column-store data table. The instruction execution apparatus 110 may further configure execution hardware for each operation in the second execution operator based on the second execution plan.

Because the second execution plan may have a plurality of branches, the instruction execution apparatus 110 may convert the data table based on a data input format of a first operator in each branch in the second execution plan. The instruction execution apparatus 110 may invoke a plurality of threads, and the plurality of threads may convert the data table in parallel, to further improve data conversion efficiency. One thread corresponds to one branch in the second execution plan, and the thread may convert the data table based on a data input format of a first operator in a corresponding branch in the second execution plan.

In consideration that code implementations of operators on different hardware may be different, when the instruction execution apparatus 110 configures execution hardware for each operator in the second execution plan based on the second execution plan, after determining the execution hardware of the operator, the instruction execution apparatus 110 may compile the operator into code supported by the execution hardware.

Figure 5:
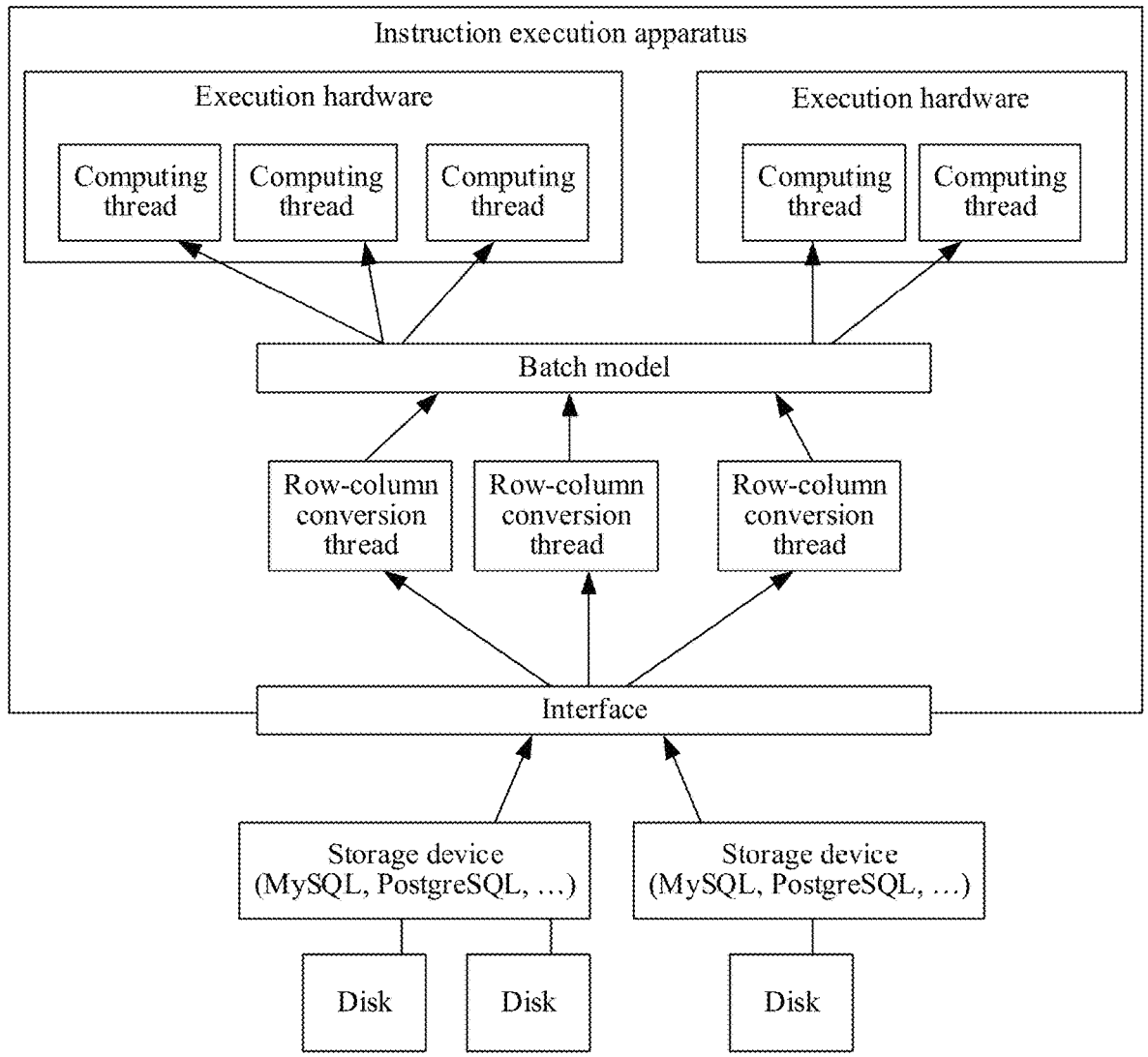
FIG. 5 is a schematic diagram of a structure of a hardware programming framework according to this application.

The instruction execution apparatus 110 may support a hardware programming framework shown in FIG. 5, to select execution hardware for the operator, to implement an operator compilation function. The following describes each component in the hardware programming architecture.

(1) Operator Procedure Layer

The operator procedure layer is configured to implement an operator procedure unrelated to hardware. In this embodiment of this application, the operator procedure layer is mainly configured to parse the second execution plan.

(2) Algorithm Layer

The algorithm layer is configured to maintain a relationship between an operator and hardware. In this embodiment of this application, the algorithm layer can determine an implementation of the operator based on the execution hardware of each operator in the second execution plan, to ensure that the implementation of the operator can match the execution hardware of the operator.

(3) Code Generation Layer

The code generation layer is configured to compile hardware-related code. In this embodiment of this application, the code generation layer may include a plurality of code generation interfaces, and each code generation interface is configured to compile one type of hardware-related code. The code generation layer may select, for the operator based on the execution hardware of the operator in the second execution plan, a code generation interface corresponding to the execution hardware. The code generation interface may generate code used to implement the operator, and the code matches the execution hardware of the operator. The figure shows an example of a code generation interface of a GPU, a code generation interface of a DPU, and a code generation interface of an ARM.

(4) Intermediate Representation (IR) Layer and Backend

An IR is an intermediate representation of a code implementation. The IR is usually unrelated to hardware. In other words, intermediate representations of code of different hardware are the same. Backends of different hardware (for example, a GPU backend, a DPU backend, and an ARM backend) may generate an executable binary file of corresponding hardware based on the IR.

It should be noted that the hardware programming framework is simply divided by function, and a division manner shown in FIG. 5 is merely an example.

When the instruction execution apparatus 110 compiles the operator into the code matching the execution hardware, and converts input data of the operator in the second execution plan into a corresponding data input format, the execution hardware may run the code, and execute the operator, to implement a processing manner represented by the operator.

Figure 6:
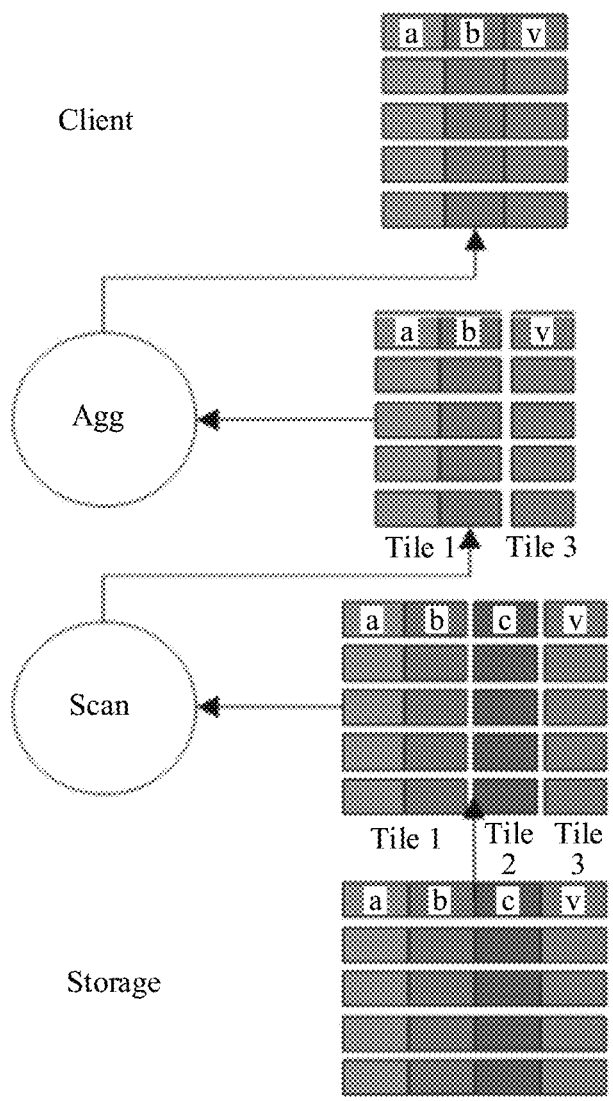
FIG. 6 is a diagram of an execution procedure of a second execution plan according to this application.

FIG. 6 shows an execution procedure in the second execution plan. The instruction execution apparatus 110 may obtain the data table in the database (for example, MYSQL, POSTGRESQL, or GREENPLUM) from a disk of the storage device 120 through an interface between the instruction execution apparatus 110 and the storage device 120. Data obtained through an interface is delivered to a plurality of threads created by the instruction execution apparatus 110 for conversion of a data format (for ease of description, the thread used for conversion of the data format may be referred to as a row-column conversion thread). The plurality of row-column conversion threads input, into a batch model, data obtained through conversion. The batch model is mainly configured to manage batch data, to transfer data to each operator. A data transfer manner in the batch model is first in first out. In an example, data that first enters a batch module first flows out of the batch model.

For the first operator in each branch in the second execution plan, when the execution hardware starts to execute the operator (that is, the execution hardware runs code used to implement the operator), one or more computing threads may be created in the execution hardware. After a plurality of computing threads are created, the plurality of computing threads can run in parallel, to execute the operator. The plurality of computing threads may read input data of the operator from the batch model in parallel.

After the plurality of computing threads may read the input data of the operator in parallel, the plurality of computing threads may perform computing in parallel, to execute the operator. After the plurality of computing threads complete computing, data obtained after the plurality of computing threads complete computing is used as input data of a second operator, to implement a data flow between operators. Execution hardware of the second operator may also create one or more computing threads, and the one or more computing threads obtain input data, to execute a second operator. A similar manner may be used as an execution manner of a remaining operator in the branch, until a last operator in the branch is executed.

To facilitate understanding of a data flow between operators in an execution process of the second execution plan, an SQL statement that needs to be implemented for a branch in the second execution plan is as follows: select a, b, sum (v) from T1 where c≥10 group by a, b The SQL statement represents that Column A, Column B, and a sum of Column V when Column C is greater than or equal to 10 needs to be read from a data table T1.

Figure 7:
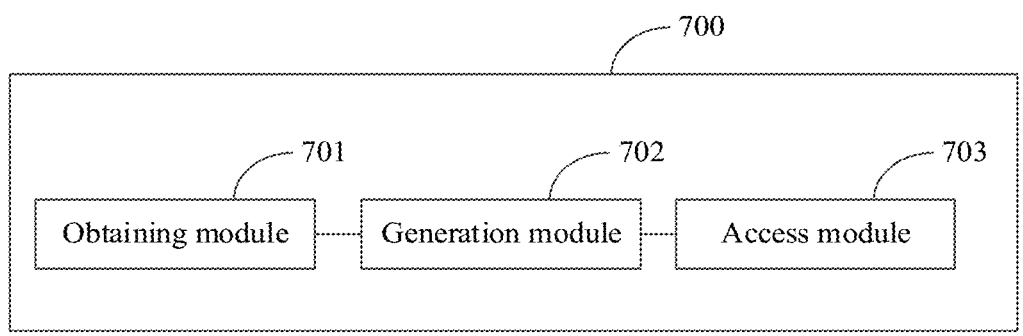
FIG. 7 is a schematic diagram of a structure of an instruction execution apparatus according to this application.

The branch includes a scan operator with a filtering function and an aggregation (aggregation) operator. As shown in FIG. 7, the data table T1 is stored in the storage device 120 in a row-store form, and the data table T1 includes four columns: Column a, Column b, Column c, and Column v. When reading the data table T1, the instruction execution apparatus 110 may convert the row-store data table T1 into a column-store data table T1 by using the row-column conversion thread. When reading the data table T1, the scan operator combines two columns a and b to form a logical column. The two columns a and b logically form Tile 1. Column c and Column v are separately stored by column, to respectively form Tile 2 and Tile 3. Column C is used by the scan operator for filtering computing. Then, the scan operator combines Tile 1 and Tile 2 into a Tile-group, and transfers the Tile-group to the aggregation operator (that is, an Agg operator). In the Agg operator, Column a and Column b participate in computing (for example, hash computing or sorting) as a whole, and Column v participates in computing of obtaining a sum. The Agg operator outputs data in a row format. Only the two columns, namely, Tile 1 and Tile 2 logically participate in row-column conversion during computing of the Agg operator. Column a, Column b, and Column v are not used as independent columns to participate computing. Computing efficiency is high.

Step 207: The instruction execution apparatus 110 feeds back an access result to the application server 130. The access result may be queried data (for example, the data access instruction indicates that the data in the data table needs to be queried), or may indicate whether access succeeds or fails (for example, the data access instruction indicates that an operation such as addition, deletion, or modification needs to be performed on the data table).

In step 207, the instruction execution apparatus 110 may directly feed back the access result to the application server 130, or may send the access result to the storage device 120, and the storage device 120 feeds back the access result to the application server 130.

Based on a same concept as the method embodiment, an embodiment of this application further provides an instruction execution apparatus. The instruction execution apparatus is configured to perform a method performed by the instruction execution apparatus in the method embodiment shown in FIG. 4. For related features, refer to the method embodiment. Details are not described herein again. As shown in FIG. 7, an instruction execution apparatus 700 can be used in a scenario in which a client initiates data access instructions for different databases. The instruction execution apparatus 700 includes an obtaining module 701, a generation module 702, and an access module 703.

The obtaining module 701 is configured to obtain a first execution plan. The first execution plan is generated based on a data access instruction initiated in any database.

The generation module 702 is configured to generate a second execution plan based on the first execution plan.

The access module 703 is configured to access data in the database based on the second execution plan.

In a possible implementation, when generating the second execution plan based on the first execution plan, the generation module 702 may process an operator in the first execution plan, to generate the second execution plan.

The processing includes some or all of the following: splitting an operator in the first execution plan, combining operators in the first execution plan, mapping the operator in the first execution plan, adjusting an execution sequence of the operators in the first execution plan, configuring a data input format for the operator in the first execution computing, and selecting execution hardware for the operator in the first execution computing.

In a possible implementation, when accessing the data in the database based on the second execution plan, the access module 703 may read a data table from the database; and the access module 703 executes operators in the second execution plan in an execution sequence of the operators in the second execution plan, to access the data table.

In a possible implementation, when the access module 703 executes the operators in the second execution plan in the execution sequence of the operators in the second execution plan, the access module 703 may convert a format of the data table based on a data input format of the operators in the second execution plan; and the access module 703 may further configure execution hardware based on the execution hardware selected for the operator in the second execution plan, to enable the execution hardware to execute the operator, and trigger the execution hardware to execute the operator.

In a possible implementation, when the access module 703 triggers the execution hardware to execute the operator, the access module 703 creates a plurality of computing threads by using the execution hardware; and enables the plurality of computing threads to run in parallel to execute the operator.

In a possible implementation, the data input format is a row-store data format or a column-store data format.

In a possible implementation, the execution hardware includes some or all of the following such as a CPU, a GPU, a DPU, an NPU, and a TPU.

It should be noted that, in embodiments of this application, division into the modules is an example and is merely logical function division, and may be other division in an actual implementation. Functional modules in embodiments of this application may be integrated into one processing module, or each of the modules may exist alone physically, or two or more modules are integrated into one module. The integrated module may be implemented in a form of hardware, or may be implemented in a form of a software functional module.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, all or some of the procedures or functions according to embodiments of the present disclosure are generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium that can be accessed by the computer, or a data storage device, for example, a server or a data center in which one or more usable media are integrated. The usable medium may be a magnetic medium (for example, a floppy disk, a hard disk, or a magnetic tape), an optical medium (for example, a digital versatile disk (DVD)), or a semiconductor medium. The semiconductor medium may be a solid-state drive (SSD).

Figure 8:
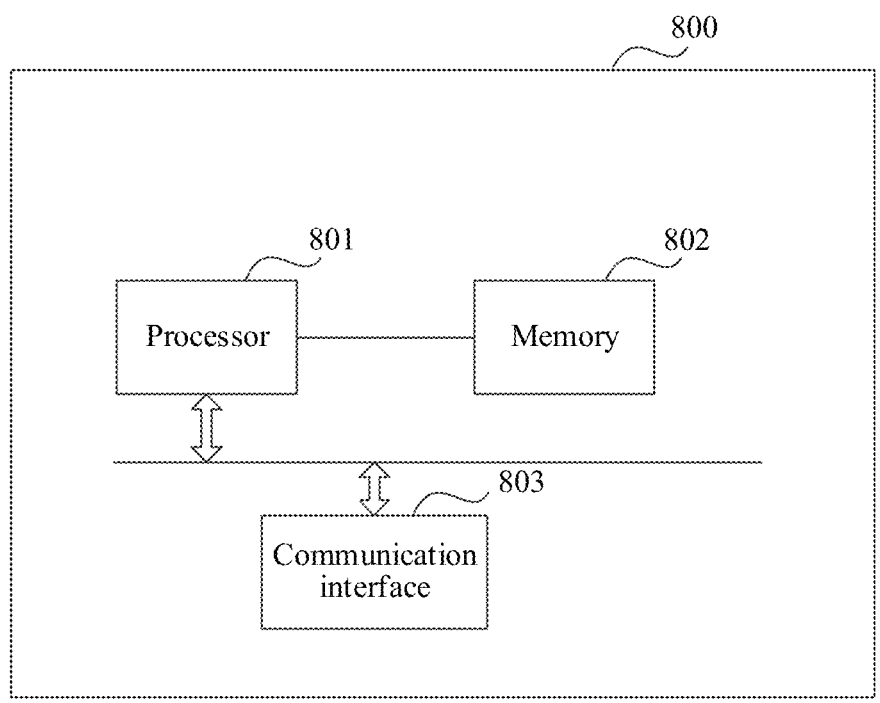
FIG. 8 is a schematic diagram of a structure of a computing device according to this application.

In a simple embodiment, a person skilled in the art may figure out that the instruction execution apparatus in the embodiment shown in FIG. 2 may be in a form shown in FIG. 8.

A computing device 800 shown in FIG. 8 includes at least one processor 801 and a memory 802, and optionally, may further include a communication interface 803.

The memory 802 may be a volatile memory such as a random-access memory (RAM). The memory may alternatively be a nonvolatile memory, for example, a read-only memory (ROM), a flash memory, a hard disk drive (HDD), or a SSD. Alternatively, the memory 802 is any other medium that can be accessed by a computer and that can be used to carry or store desired program code in an instruction or data structure form, but is not limited thereto. The memory 802 may be a combination of the foregoing memories.

In this embodiment of this application, a specific connection medium between the processor 801 and the memory 802 is not limited.

The processor 801 may be a CPU, or the processor 801 may be another general-purpose processor, a digital signal processor (DSP), an application-specific integrated circuit (ASIC), a field-programmable gate array (FPGA) or another programmable logic device, a discrete gate or transistor logic device, a discrete hardware component, an artificial intelligence chip, a system on chip, or the like. The general-purpose processor may be a microprocessor, another processor, or the like.

When an instruction execution apparatus 700 is in the form shown in FIG. 7, the processor 801 in FIG. 8 may invoke computer-executable instructions stored in the memory 802, so that the instruction execution apparatus 700 can perform the method performed by the instruction execution apparatus in any one of the method embodiments.

In an example, all functions/implementation processes of the obtaining module 701, the generation module 702, and the access module 703 in FIG. 7 may be implemented by the processor 801 in FIG. 8 by invoking the computer-executable instructions stored in the memory 802. Alternatively, functions/implementation processes of the generation module 702 and the access module 703 in FIG. 5 may be implemented by the processor 801 in FIG. 8 by invoking the computer-executable instructions stored in the memory 802, and functions/implementation processes of the obtaining module 701 in FIG. 7 may be implemented by the communication interface 803 in FIG. 8.

A person skilled in the art should understand that embodiments of this application may be provided as a method, a system, or a computer program product. Therefore, this application may be in a form of a hardware-only embodiment, a software-only embodiment, or an embodiment with a combination of software and hardware. In addition, this application may be in a form of a computer program product that is implemented on one or more computer-usable storage media (including but not limited to a disk memory, a compact disc ROM (CD-ROM), an optical memory, and the like) that include computer-usable program code.

This application is described with reference to the flowcharts and/or block diagrams of the method, the device (or system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

These computer program instructions can be stored in a computer-readable storage that can instruct the computer or the another programmable data processing device to work in a specific way, so the instructions stored in the computer-readable storage generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

A person skilled in the art may make various modifications and variations to this application without departing from the scope of this application. In this way, this application is intended to cover these modifications and variations of this application provided that they fall within the scope of the claims of this application and their equivalent technologies.

What is claimed is:

1. A data access method for a database, wherein the data access method comprises:
    obtaining a first execution plan, wherein the first execution plan is based on a data access instruction initiated in any one of a plurality of databases, wherein the first execution plan comprises a first operator and second operators, and wherein the databases comprises a first database;
    generating a second execution plan based on the first execution plan, wherein the second execution plan comprises third operators;
    reading a data table of the first database;
    executing the third operators by:
        converting a format of the data table based on a data input format of the third operators;

selecting first execution hardware for the third operators;
configuring second execution hardware based on first execution hardware to execute the third operators, wherein configuring the second execution hardware comprises:
selecting code generation interfaces corresponding to the third operators, wherein each code generation interface of the code generation interfaces is configured to compile a type of hardware-related code; and
generating, by each code generation interface, a respective hardware-related code for a corresponding operator of the third operators, wherein the hardware-related code matches execution hardware of the corresponding operator; and
triggering the second execution hardware to execute the third operators; and
accessing data in the data table based on executing the third operators.

2. The data access method of claim 1, wherein generating the second execution plan comprises processing the first operator to generate the second execution plan, wherein processing the first operator comprises at least one of splitting the first operator, combining the second operators, mapping the first operator, adjusting an execution sequence of the second operators, configuring a data input format for the first operator, or selecting third execution hardware for the first operator.

3. The data access method of claim 1, wherein accessing the data comprises executing the third operators in a third execution sequence of the third operators for accessing the data table.

4. The data access method of claim 1, wherein triggering the second execution hardware to execute the third operators comprises:
creating a plurality of computing threads using the second execution hardware; and
enabling the computing threads to run in parallel to execute the third operators.

5. The data access method of claim 2, wherein the data input format is a row-store data format.

6. The data access method of claim 2, wherein the first execution hardware comprises at least one of a central processing unit (CPU), a graphics processing unit (GPU), a deep-learning processing unit (DPU), a neural-network processing unit (NPU), or a tensor processing unit (TPU).

7. A computing apparatus, comprising:
a memory configured to store program instructions; and
at least one processor coupled to the memory and configured to execute the program instructions to cause the computing apparatus to:
obtain a first execution plan, wherein the first execution plan is generated based on a data access instruction initiated in any one of a plurality of databases, wherein the first execution plan comprises a first operator and second operators, and wherein the databases comprises a first database;
generate a second execution plan based on the first execution plan, wherein the second execution plan comprises third operators;
read a data table of the first database;
execute the third operators by:
converting a format of the data table based on a data input format of the third operators;
selecting first execution hardware for the third operators;
configuring second execution hardware based on first execution hardware to execute the third operators, wherein configuring the second execution hardware comprises:
selecting code generation interfaces corresponding to the third operators, wherein each code generation interface of the code generation interfaces is configured to compile a type of hardware-related code; and
generating, by each code generation interface, a respective hardware-related code for a corresponding operator of the third operators, wherein the hardware-related code matches execution hardware of the corresponding operator; and
triggering the second execution hardware to execute the third operators; and
access data in the data table based on executing the third operators.

8. The computing apparatus of claim 7, wherein the program instructions, when executed by the at least one processor, further cause the computing apparatus to process the first operator to generate the second execution plan, wherein processing the first operator comprises at least one of splitting the first operator, combining the second operators, mapping the first operator, adjusting an execution sequence of the second operators, configuring a data input format for the first operator, or selecting third execution hardware for the first operator.

9. The computing apparatus of claim 7, wherein the program instructions, when executed by the at least one processor, further cause the computing apparatus to: execute the third operators in a third execution sequence of the third operators for accessing the data table.

10. The computing apparatus of claim 7, wherein the program instructions, when executed by the at least one processor, further cause the computing apparatus to:
create a plurality of computing threads using the second execution hardware; and
enable the computing threads to run in parallel to execute the third operators.

11. The computing apparatus of claim 8, wherein the data input format is a row-store data format or a column-store data format.

12. The computing apparatus of claim 8, wherein the first execution hardware comprises at least one of a central processing unit (CPU), a graphics processing unit (GPU), a deep-learning processing unit (DPU), a neural-network processing unit (NPU), or a tensor processing unit (TPU).

13. A computer program product comprising computer-executable instructions that are stored on a non-transitory computer-readable storage medium and that, when executed by at least one processor, cause a computing apparatus to:
obtain a first execution plan, wherein the first execution plan is generated based on a data access instruction initiated in any one of a plurality of databases, wherein the first execution plan comprises a first operator and second operators, and wherein the database comprises a first database;
generate a second execution plan based on the first execution plan, wherein the second execution plan comprises third operators;
read a data table of the first database;
execute the third operators by:
converting a format of the data table based on a data input format of the third operators;

selecting first execution hardware for the third operators;

configuring second execution hardware based on first execution hardware to execute the third operators, wherein configuring the second execution hardware comprises:

selecting code generation interfaces corresponding to the third operators, wherein each code generation interface of the code generation interfaces is configured to compile a type of hardware-related code; and generating, by each code generation interface, a respective hardware-related code for a corresponding operator of the third operators, wherein the hardware-related code matches execution hardware of the corresponding operator; and triggering the second execution hardware to execute the third operators; and access data in the data table of the first database based on executing the third operators.

14. The computer program product of claim 13, wherein the computer-executable instructions, when executed by the at least one processor, further cause the computing apparatus to process the first operator in the first execution plan to generate the second execution plan, wherein processing the first operator comprises at least one of splitting the first operator, combining the second operators, mapping the first operator, adjusting an execution sequence of the second operators, configuring a data input format for the first operator, or computing and selecting third execution hardware for the first operator.

15. The computer program product of claim 13, wherein the computer-executable instructions, when executed by the at least one processor, further cause the computing apparatus to:

execute the third operators in a third execution sequence of the third operators for accessing the data table.

16. The computer program product of claim 13, wherein the computer-executable instructions, when executed by the at least one processor, further cause the computing apparatus to:

create a plurality of computing threads using the second execution hardware; and enable the computing threads to run in parallel to execute the third operators.

17. The computer program product of claim 14, wherein the data input format is a row-store data format.

18. The computer program product of claim 14, wherein the data input format is a column-store data format.

19. The computer program product of claim 14, wherein the first execution hardware comprises at least one of a central processing unit (CPU), a graphics processing unit (GPU), a deep-learning processing unit (DPU), a neural-network processing unit (NPU), or a tensor processing unit (TPU).

20. The data access method of claim 2, wherein the data input format is a column-store data format.

* * * * *